Aug. 18, 1959 L. M. CURTISS 2,900,435
ELECTRICAL CONDUIT BUSHING
Filed May 2, 1955 2 Sheets-Sheet 1
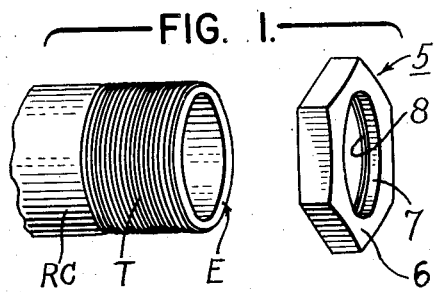
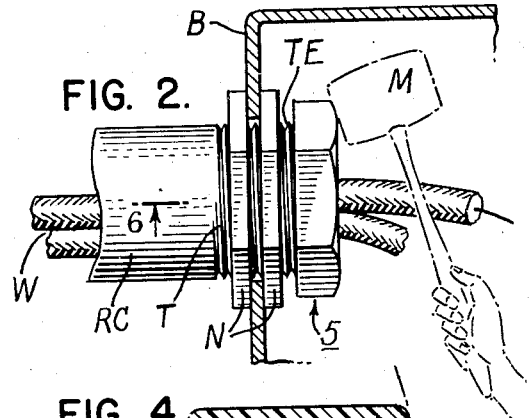
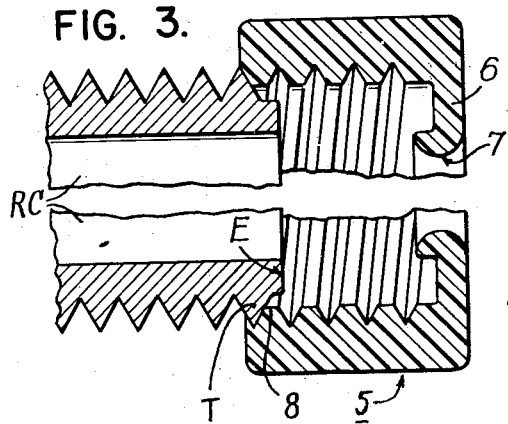
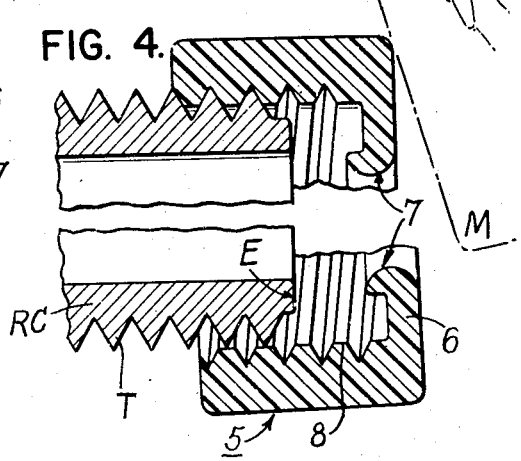
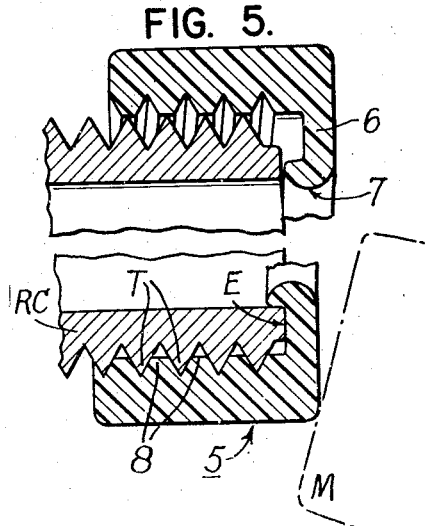
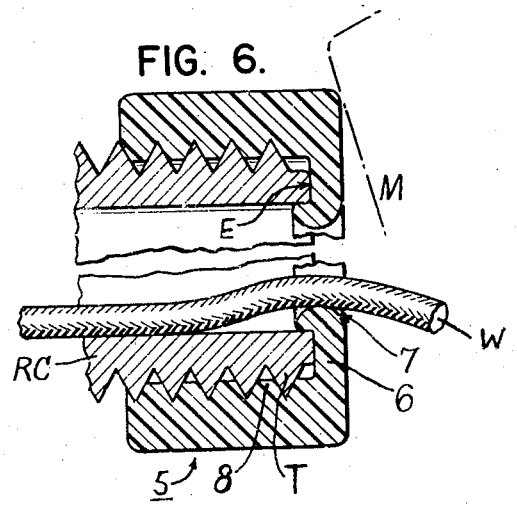
INVENTOR
Lawrence M. Curtiss
BY
James C. Ledbetter
ATTORNEY Aug. 18, 1959 L. M. CURTISS 2,900,435
ELECTRICAL CONDUIT BUSHING
Filed May 2, 1955 2 Sheets-Sheet 2
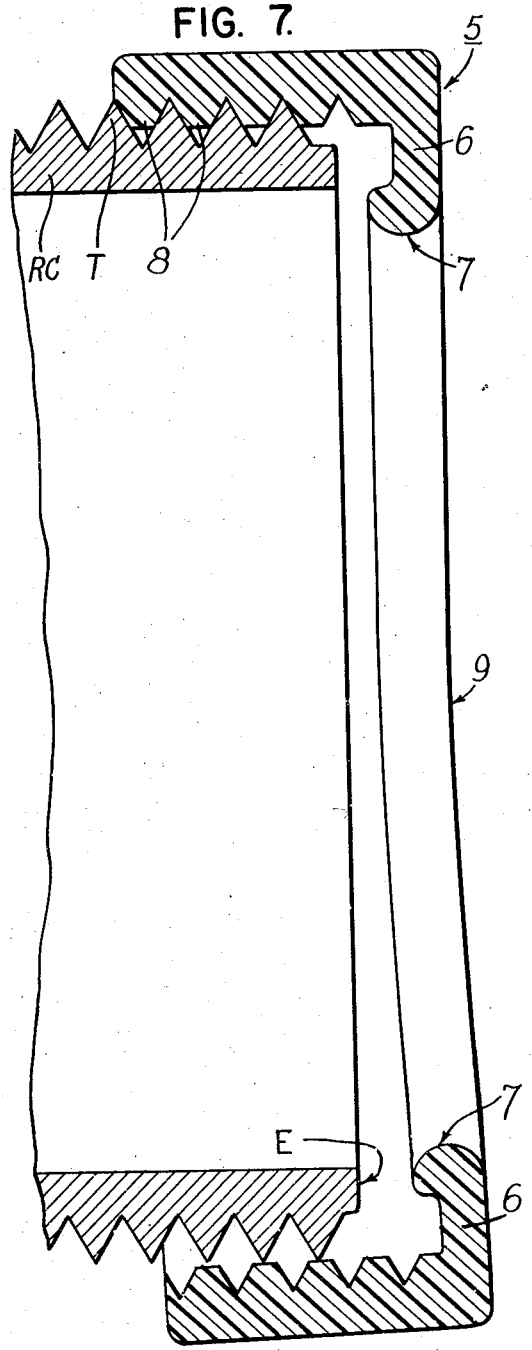
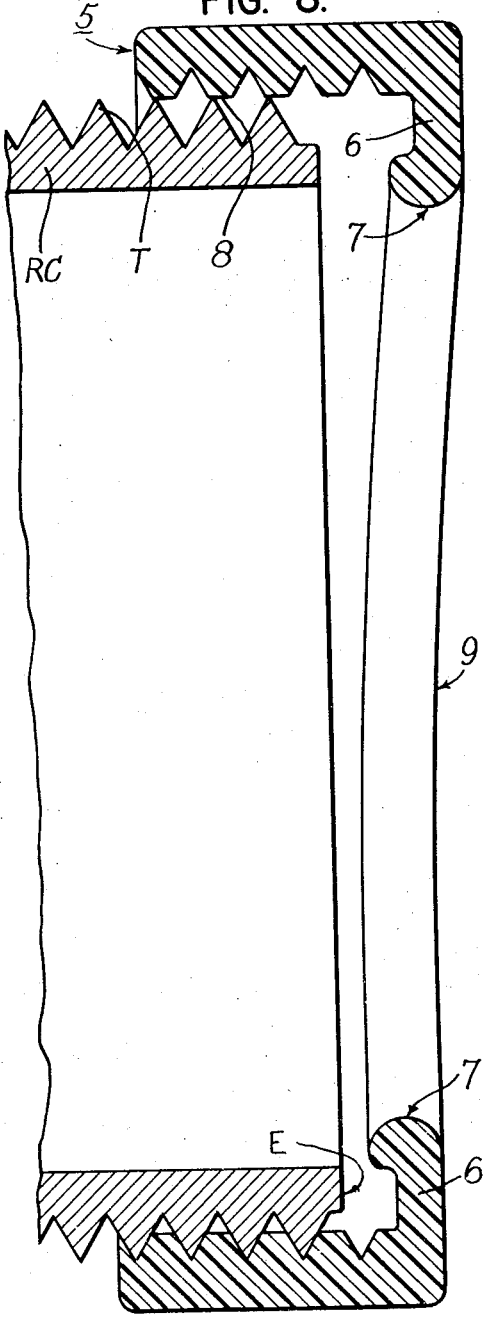
INVENTOR
Lawrence M. Curtiss
BY James C. Ledbetter
ATTORNEY

United States Patent Office 2,900,435
Patented Aug. 18, 1959

2,900,435

ELECTRICAL CONDUIT BUSHING

Lawrence M. Curtiss, Mountainside, N.J., assignor to The Thomas & Betts Co., Elizabeth, N.J., a corporation of New Jersey Application May 2, 1955, Serial No. 505,082

1 Claim. (Cl. 174—83)

This invention relates to an electrical conduit bushing having novel structural characteristics and newly discovered functions which make for increased convenience of installation and a longer period of service protection for electric-light and power-wiring systems in housing and building construction.

This new bushing terminates the standard externally screw-threaded open end of an electrical raceway in the system. Raceways enclose and protect the insulation-covered conductors. The wiring thereof emerges from an open raceway end and enters a conduit wiring box, or else it leads directly from the open end to a service connection. This new bushing is formed entirely of select insulating material and thus has a dielectric (insulation lined) throat surface to protectively guide and support the wiring as it emerges from the raceway open end.

The bushing is for use on the externally screw-threaded open end of rigid conduit, i.e., thick-wall (standard weight or gage) metallic pipe adapted to electrical conduiting and also with raceway fittings having standard threaded hubs like the threaded ends of such conduit. This bushing is not intended for terminating other species of raceways, such as thin-wall metallic tubing known as EMT, or flexible-armored cable of either the BX type or the flexible-metallic conduit type, or non-metallic sheathed cable, except that by first terminating these last mentioned raceways with other fittings which themselves have the standard screw-threads of said rigid conduit. It was found, in the course of solving the instant problems, that various conduit bushings for the several last mentioned species of electrical conduiting did not provide select functions sought for in the prior art when developing and reducing this invention to practice.

A variety of known types of bushings are available to the electrical building trade (usually metallic bushings) for terminating the open screw-threaded ends of rigid conduits. It is through these metallic-throat bushings that the electrically-charged wiring emerges from the long run of a conduit. It is well known that metallic bushings are sometimes pitted and rough with burrs on their throat surfaces and thus do not provide the best exit passageway from a raceway end.

Accordingly, the insulation on live conductors is likely to be damaged by frictional abrasion and burr cuts, when fishing, pulling and dragging the loose wiring through the conduit and out from the metallic-bushing throats into the open. Once through the bushing throat, the fault is repeated by manipulating and bending the wires in and against the bushing throat when making the usual electrical connections.

Moreover, after an installation is completed in a building and the power system is in operation, the raceway and/or the circuit wires may vibrate and the latter rub against the pitted and rough surface of the metallic bushing. In time, this fault causes wear and deterioration of the insulation covering on live wires and may lead to misoperation by a short-circuit burn-through at the metallic bushing and result in starting a fire.

It is precisely at the point of emergence of the wiring from the bushed conduit end, where the wires come out into the open (no longer protected by the conduit), and either enter the wiring box or lead directly to some other service connection, that marks a critical and danger spot in a raceway system. It is the bushing which marks this place and which comprises one of the more important fittings in the installation.

It is also to be remembered that standard bushings in general use are screw-threaded and require time and patience in properly screwing (rotating) them into place. The metallic screw-threads of the rigid conduit and of the bushings are sometimes damaged by "crossing" the threads, the thread of one cutting or chipping the thread of the other. The time consumed and damage done are faults detrimental to the completion of a good raceway installation, preclude reuse of raceway components, and pose problems solved by this invention.

Explaining further, it is known that conduit boxes of various types are usually of limited size. Service outlets and the wiring are cramped into small space. Especially in close quarters (in corners), it is difficult and time consuming for a workman to subject the standard threaded bushing to a considerable number of turns (rotation) with a wrench or other tool. Several turns are required to screw the bushing into final position for protectively guiding and supporting the wires, at the critical and wear point, where they emerge from the conduit end.

The foregoing briefly explains particular problems which this invention is presented to solve. Note again the "crossing" of screw-threads and the damage thus caused. It is significant and an asserted point of novel advantage that this invention adopts the principle of "crossing" threads as a means of quickly installing the bushing, doing so without damage to the screw-threads of the components involved.

The trade recognizes, and the prior art teaches, that the better practice is to terminate rigid conduit with a smooth dielectric bushing throat or annulus—thus importantly providing a non-conductive throat passage and wire seat or rest—at the critical wear point where the installation-covered electrically-charged wiring loosely emerges from the open end of a conduit run. A non-metallic throat provides a better wire passage, makes a cushioning seat or rest, and does not wear the insulation-covered wiring when the raceway vibrates. A non-conductive bushing throat constitutes enduring assurance against misoperation and short circuit faults at the critical place in all raceway work.

Despite the need in the trade and the teachings of the art, the optimum bushing has not been available at a suitable price and for specific use with rigid conduit. The standard metallic bushing remains largely in use, in the face of all circumstances, some of which have been briefly explained as a part of this effort to advance the art.

Accordingly, it is the purpose of this invention to provide a practical bushing which meets the several foregoing requirements in solving those problems mentioned and others hindering the trade in its quest of a new bushing for rigid conduit.

*The drawings*

This specification and its claimed subject matter, with the accompanying drawings, describe the invention as preferred and embodied at this time for an understanding of the problems sought to be solved. Since the teachings herein may suggest changes to others who wish to avail themselves of the benefits of the invention, it will be appreciated that subsequent modifications hereof may well be equivalent in form and hence the same in spirit and principle as this disclosure.

This new bushing shown in the drawings comprises a one-piece fitting formed of semi-hard elastic and tough plastic and, thereby, has a dielectric throat. It is formed with internal screw-threads having a truncated or flat-crest, uniformly dimensioned from end to end of its helical length. This characteristic thread enables the bushing to be tapped, hammered, and axially forced or "knocked" by "cross" thread action onto the rigid metallic screw-threads of the conduit end. Accordingly, the bushing need not be rotated to screw it into final place; it is driven on by a sudden force exerted axially (longitudinally) of the conduit.

One satisfactory type or example of plastic material used for producing this bushing is cellulose acetate buterate, medium hardness, and known as Tenite II. Such material has a molecular structure of superior physical properties suitable for this new manufacture. It has a hard surface which resists scratching in its sudden axial pressure coaction with the rigid metallic conduit screw-threads. It is less hard than the metallic screw-threads and does not damage them during the sudden pressure operation and radial stretching which occurs when "knocking" the bushing into final position coaxial on and dielectrically masking and sealing off the conduit end.

Such plastic forms a one-piece bushing which has a limited amount of give. Thus it possesses limited flexibility, an allowable degree of stretch, and a positive spring-back when subjected to substantial radially tensioned expansion or fractional enlargement required for the bushing to slide, with a "cross" thread ratcheting action, into coaxial embracing and locked position on the rigid conduit threaded end shown in the drawings.

Fig. 1 is a perspective view of a fragment (the screw-threaded end) of a conventional rigid metallic conduit and this new insulating bushing spaced therefrom. Both are small size for a minimum number of electrical conductors.

Fig. 2 shows a box (as in the ceiling of a building) with the conduit in place. The open free end of the conduit within the box is masked and terminated by the bushing, and a pair of conductors have been pulled into the box. A mallet or other tool, in the hand of a workman, has made its last stroke in "knocking" the bushing into position, as also shown by the enlarged (Fig. 6) fragmentary detail.

The views to follow are drawn to large scale representation of large size conduits carrying numerous circuit wires. More particularly, the thread views are enlarged to better illustrate the combined non-rotative screw-thread coaction. By necessity, these views show upper and lower fragments of the conduit and bushing, as developed from Figs. 7 and 8.

Fig. 3 shows the bushing initially placed against the first screw-thread of the conduit, ready to be knocked into place thereon.

The next three are action views of the characteristic knock-on mode of installing the bushing on the conduit end. The action is a progressive one. Preferably, you do not knock the bushing on with one mallet stroke. About four or several taps are called for, alternatively, first on the upper side and then the lower. However, the views to follow show three strokes. They are presented for the purpose of demonstrating one example of the novelty, in the combined action, of the two threaded components, in their cross-thread, crest-seating, and root-registering coaction under the suddenly applied force of a "knock-on" tool.

Fig. 4 shows the mallet striking the upper side of the bushing, with the result that the upper portion of its first two truncated screw-threads and the sharp-crest metallic screw-threads have cross engaged, while their lower portions are partly cross engaged but crest-seated on each other. The bushing has momentarily radially stretched under the sudden force of the mallet.

Fig. 5 shows a mallet tap next applied against the lower side of the bushing, thus advancing the crest-seated threads of Fig. 4 to final locked position; and Fig. 6 repeats with another mallet tap at the upper side, thus driving the bushing home. All screw-threads are in final position without being damaged. The bushing may be removed by the usually slow method of unscrewing it and reused.

Thus Fig. 6 (like Fig. 2) shows the conduit end masked and sealed-in by the elastic bushing. One of the insulated conductors of Fig. 2 is shown; note how the bushing throat serves as a lift-rest to support and guide the conductor away from the end of the conduit in leading outward therefrom into the open, i.e., either into the box space or directly to some service connection not requiring a box.

It is somewhat difficult to illustrate (as in the foregoing fragmentary views) the momentary distortion in the stretch and elastic spring-back of the "knock-on" bushing during the two or three quick blows of the mallet. Accordingly, the next two views have been patterned from a large size bushing made under this invention. Both views are axial sections but in full diameter.

Accordingly, Figs. 7 and 8 are sufficiently large to illustrate what is understood to be the slight radial bowing or bending of the outer end face rim (the masking flange) during the knock-on crossing-thread action of advancing the truncated (dull) threads against and over the full (sharp) threads.

The foregoing describes the invention and its advantages, but the reference characters on the drawings are in greater detail.

Conventional raceway of the rigid conduit type

A piece of rigid conduit RC is broken off, from its long run in a ceiling, and shown with its open end screw-threaded at T. These standard threads T are die-cut and V-shaped in section, on this type of thick-wall piping, and thus have sharp-crests. The end-edge E (annular extremity) is usually rough, with its inner corner abrupt and sometimes burred. Also, the die-cut first thread at the end-edge E may have burr points.

After the conduit RC is inserted through the knock-out hole of a box B, with the open end E well within the box, a pair of metallic lock nuts N establish a ground connection and mechanical joint between these two raceway components. The inner lock nut N is set tightly against the box wall, with the conduit threaded end well into the box beyond said inner lock nut.

Next, the threaded end TE, projecting beyond the inner lock nut N (with adequate clearance and working space at TE) must be sealed-off, i.e., bushed at 5 to mask the rough end-edge E of the conduit in the box B. Thereafter, the insulation-covered electrical conductors (wiring W) are fished and pulled through the RC conduit run, through its open bushed terminus at 5, and thus come out in the open space of the box B where they can be handled, pulled and trimmed for making various electrical connections in the box.

As said before, it is at the bushed terminus 5 where damage may occur to the wiring (its insulation) when dragging it into the box B. Thereafter, in service, vibration of the conduiting may wear a thin spot in the insulation, especially so if the terminus 5 is metallic bushed.

The new insulating bushing

The drawings herein are made from molded bushings, and molding is a satisfactory method of production. The bushing consists of a dielectric annulus or ring-like body designated at 5 as a whole. It may be formed or molded with a hex-periphery as a wrench grip for unscrewing and removing it from the rigid conduit RC for reuse.

The outer end face has a masking rim, in the form of a radially inward flange 6. This flange defines a restricted central wire passage throat 7. The molded insulation bushing throat opening 7 is coaxial with the body annulus 5, hence with the conduit RC. Note that the throat 7 is smaller than the inside diameter of the conduit. It is thus slightly restricted, as in the case of bushings in general.

The importance of the masking rim 6 is observed in Fig. 6; it seals-in the rough open end-edge E of the conduit. The same view reveals the importance of the restriction of the throat size at 7; it forms a lift-rest and serves as a support to elevate the insulated conductors W away from the conduit rough end-edge E, where they emerge from the protection of the conduit run and come out into the open.

The shape and form per se of the annulus 5, its portions 6 and 7 (thus far described under the instant topic heading) necessarily conform to standard practice, else the bushing would fail to meet the conventional requirements of rigid conduiting in wide spread use. The annulus 5 as such, merely constitutes the setting and environment for the inventive concept.

The novelty is believed to inhere in those features which combine to make up the appended claimed subject matter and elsewhere described in this specification, as in the mode of operation, etc., coupled with the solution of problems which plague the wide spread use of rigid conduit, and also inhere in a suitable form of molded screw-threads, as next described.

Screw-threads 8 of tough resilient plastic are molded on the inside of the resilient annulus 5 and are adopted to coact, in a new way, with the well known V-shaped rigid sharp-crest threads T of the conduit. Good results, if not the best, growing out of all experiments performed, have been achieved from the truncated type of screw-thread 8 herein shown.

The flat-crest threads 8 are well suited to meet the problem. They are integrally molded in the annulus to produce the finished bushing 5. The moldable material, and its characteristics after the molding, have been described. The drawings show that the plastic screw-threads 8 are merely sharp-crest threads modified by uniformly truncating them throughout their helical length.

The drawings also show that the molded angle of the modified (truncated) elastic threads 8 is the same as the die-cut angle of the standard pipe threads T and that this new bushing is adapted for use with any raceway component having such threads. Thus the two contrasting screw-threads 8 and T match in registry and make angular surface contact throughout their engaged helical lengths.

The front or forward surfaces of the rigid threads T (facing toward the conduit end E) act to enforce a camming expansion of the elastic threads 8 because their angular surfaces conform to the conventional angle of the rigid threads T. The sudden mallet force applied to the throated end 6, 7 of the bushing, causes its yielding screw-threads 8 to cam against and to radially stretch and climb the unyielding (rigid) threads T, and then to slide longitudinally across them. Thereupon, the elastic threads 8 contract back to molded size with a locking force toward the root diameter of the rigid threads T.

The operation and utility of the two different screw-threads in their adapting combination have been described. However, there are other points of discovered interest believed to merit the claim made for this invention and additionally to demonstrate its distinctions over other rigid conduit bushings in the prior art.

At this point in the description, one examining this invention with interest will have already noted the proportion in the drawings in respect to the sharp-crest standard pipe thread T diameter and the novel flat-crest thread 8 diameter. The drawings show the recommended proportion arrived at in making the invention. The flat-crest 8 has a root-depth of one-half (approximately) that of the sharp-crest thread T. This gives good results, but is not critical, and may vary on one side or the other of the illustrated proportion. The one-half root-depth of the thread 8 is entirely adequate in locking function with the full root-depth of the thread T.

The truncated dull-thread (flat-crest form) leaves a root-space between the flat 8 of the elastic thread and the root diameter (the bottom) of the rigid metallic thread T. Such root-space minimizes the frictional affinity which the plastic thread 8 has for the metallic thread T and reduces the torque required of a wrench to unscrew the "knocked-on" bushing from the gripping lock which it makes on the conduit RC.

Furthermore, the increase in crest diameter, achieved by the truncation at 8, reduces the amount of radial stretch (expansion) which the elastic bushing 5 undergoes when its angular surface threads climb (cam fashion) up the side of the V-shaped rigid metallic threads T. The camming action is readily accomplished by the truncated (one-half) proportion shown, because the flat 8 of the plastic thread makes for ruggedness, and it "crosses over" the sharp thread T without being damaged.

Again, the flat surface 8 of the recommended one-half root-depth provides a substantially non-scratching and non-chipping seat for the sharp edge of the thread T when the two come to rest (stop) against each other between strokes of the mallet M. See the lower side of Fig. 4 and the upper side of Fig. 5. The width of the flat helix 8 (as shown) gives good results and avoids damage to the plastic threading of this new bushing.

*Figs. 7 and 8*

These large scale views are helpful to an understanding of further principles and the operating mode of this all-plastic resilient bushing. It is discovered that the plastic masking rim 6, at the outer end of the bushing, possesses one or more functions wholly new and thereby in addition to its other worthwhile advantages of providing a dielectric and non-wearing seat for the insulation-covered electrically-charged wires W.

Significantly, it appears that the resilient masking rim 6 controls, or at least aids, the expansion and contraction of the threads 8. These helpful functions stem from the inward bowing action or distortion, as at 9, under the camming-pressure which is suddenly and momentarily produced between the conforming angular surfaces of the two different threads T and 8 due to the sudden longitudinal impact from the mallet M.

The inward bow or elastic give at 9, of the masking rim 6, at the outer end of the bushing, permits or contributes to the forced expansion of the inner end, and it also adds to the springback of said inner end. It is the inner end which presents the first plastic thread 8 in engagement with the first metallic thread T, when the bushing is initially positioned (see Fig. 3) against the conduit end-edge E.

It follows that the first light tap of the mallet M (Fig. 4), against or near the rim 6, results in a quick response to the forced expansion at the inner end by which the latter initially and readily slides onto the first one or two threads T. In other words, the inner end of the bushing more easily expands and accepts an easy start onto the conduit RC. When fully on (see Fig. 6), the outer end (being stiffer by virtue of the masking rim 6) imposes a maximum locking pressure between the first thread T and the last thread 8.

The foregoing quality of the masking rim 6, and its contribution of the new and helpful functions just described, have aided the conception and completion of this invention in making the bushing practical and convenient to handle. The bushing is easy to install, full-fashioned, all-molded, and is entirely free of metallic parts, either for its screw-threads or other portions thereof. The discovery of these several features lead to an appreciation of principles involved and a solution of the problems pertaining to rigid metallic conduit.

This disclosure explains the principles of the invention and the best mode contemplated in applying them, so as to distinguish the invention from others; and there is particularly pointed out and distinctly claimed the part, improvement or combination which constitutes this discovery as understood by a comparison thereof with the prior art.

What is claimed is:

A knock-on insulating bushing, for terminating a rigid metallic electrical conduit, to protect the insulation of electrically charged wiring where it emerges from the open end of said electrical conduit, the latter having external standard rigid screw-threads; said knock-on bushing comprising a one-piece body structure, consisting of an annulus, having a shorter axial length than the axial length of said standard rigid screw-threads on the end of the electrical conduit with which it is adapted to be used; and also having a masking flange, with a central throat of frictionless insulation adapted to loosely pass said electrically charged insulated wiring therethrough; said knock-on bushing being formed of semi-hard elastically tough plastic, having a hard surface, with a smooth and frictionless finish, which resists scratching, but is of less hardness than said rigid screw-threads of the conduit, and which gives and expands when hammered; said knock-on bushing having screw-threads formed integrally on the inside thereof, the root diameter of which conventionally conforms to the crest diameter of said rigid screw-threads, and the surfaces of which also conform to the surfaces of said rigid screw-threads; and the plastic screw-threads being truncated, thereby having flat crests, the diameter of said flat crests being substantially greater than the root diameter of said rigid metallic screw-threads, whereby the flat crests are spaced (have clearance) from said root diameter; the combination of the truncated plastic screw-threads with said rigid metallic screw-threads thus providing a coacting frictional differential, resulting from the dissimilarity of their constituent materials, also from the difference in degree of their two hardnesses, and from the dimensional difference (clearance) between their root and flat crest diameters; whereby said knock-on bushing is adapted to be installed on said conduit open end, by hammering the flange alternately on first one side and then the other, thereby forcing said conforming screw-thread surfaces together, and causing said plastic truncated screw-threads to cam against, and to radially stretch an amount equal to the thread flat crest truncation, and radially climb outward and over the rigid screw-threads, and elastically spring back toward the root of said rigid screw-threads, effecting a "thread-crossing" action of the two differently constituted screw-threads; thus quickly locking said knock-on insulating bushing in service position, the flange of which dielectrically seals off and isolates all metallic burr roughness at the conduit end-edge from the wiring insulation, and being removable therefrom by the conventionally slow operation of unscrewing said bushing with a wrench.

References Cited in the file of this patent

UNITED STATES PATENTS

| | | |
|---|---|---|
| 1,368,222 | Foreman | Feb. 8, 1921 |
| 2,133,049 | Shimer | Oct. 11, 1938 |
| 2,338,316 | Buzzell | Jan. 4, 1944 |
| 2,727,651 | Mickelson | Dec. 20, 1953 |
| 2,770,668 | Appleton | Nov. 13, 1956 |
| 2,826,222 | Case | Mar. 11, 1958 |

FOREIGN PATENTS

| | | |
|---|---|---|
| 352,540 | Great Britain | July 13, 1930 |